No. 757,405.  
PATENTED APR. 12, 1904.  
L. LYNDON.  
BOOSTER APPARATUS.  
APPLICATION FILED AUG. 21, 1902.  
NO MODEL.
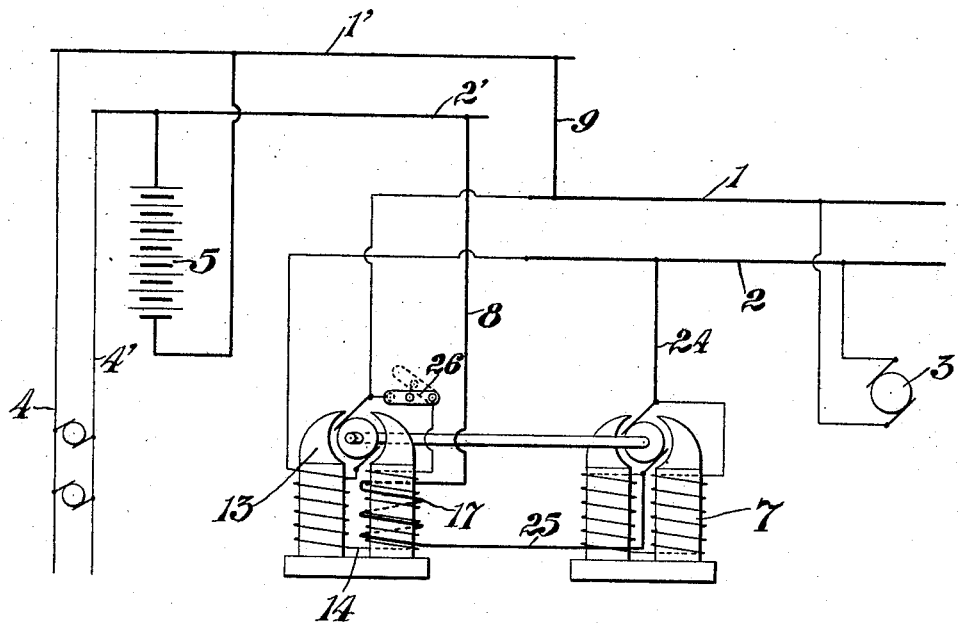
Attest:  
A. N. Jesbera  
L. E. Naumeys
Inventor:  
Lamar Lyndon  
by Redding Kiddle Greeley  
Attys.

No. 757,405. Patented April 12, 1904.

UNITED STATES PATENT OFFICE.

LAMAR LYNDON, OF NEW YORK, N. Y., ASSIGNOR TO NATIONAL BATTERY COMPANY, OF JERSEY CITY, NEW JERSEY, AND BUFFALO, NEW YORK, A CORPORATION OF NEW JERSEY.

BOOSTER APPARATUS.

SPECIFICATION forming part of Letters Patent No. 757,405, dated April 12, 1904.

Application filed August 21, 1902. Serial No. 120,439. (No model.)

*To all whom it may concern:*

Be it known that I, LAMAR LYNDON, a citizen of the United States, residing in the borough of Manhattan, in the city, county, and State of New York, have invented certain new and useful Improvements in Booster Apparatus, of which the following is a specification, reference being had to the accompanying drawings, forming a part hereof.

This invention relates to devices for boosting the current-potential in electrical systems of distribution; and its object is to provide an improved means of regulation in order to secure as nearly as possible a constant flow of current from the generator regardless of the variation in the external load.

It is well known that in electrical systems of supply and distribution wherein storage batteries or similar electrical machines are employed either as a source of power or as consumption devices the electromotive force of any system is subject to constant variations due to the changes which are constantly taking place in the condition of the storage batteries. It is therefore desirable to provide some means of boosting the electromotive force of the system either positively or negatively, but proportionately to the rise and fall of the electromotive force.

In Letters Patent of the United States No. 648,874, granted to me May 1, 1900, for improvements in booster apparatus for systems of electrical distribution there is described a means of regulation for a boosting device in which the auxiliary generator or booster is in circuit on the line and the speed of the armature of the auxiliary generator or booster is made responsive to current conditions in the booster-circuit. In the present invention the same arrangement of circuits has been retained, and additional means have been added to make the changes in the speed of the booster-armature conform more accurately with the changes in the current conditions of the line.

In the accompanying drawings a diagrammatic view of the system of electrical distribution embodying this invention is illustrated.

The main generator or dynamo (shown at 3) supplies current to the generator bus bars or wires 1 and 2. The power bus-bars 1' and 2', which supply current to the consumption-circuit 4 4' and under certain conditions to a storage battery 5, are in circuit with the generator bus-bars 1 and 2, the bus-bars 1 and 1' being connected by a conductor 9 and the bus-bars 2 and 2' being connected through auxiliary generator or booster 7, coil 17, and conductor 8.

It will be understood that conductor 9 is diagrammatically illustrated and may comprise resistances, storage batteries, or any other electrical devices which it is found desirable to insert and that the consumption-circuit is also diagrammatically illustrated and may comprise lamps, motors, storage batteries, translating devices, or any other forms of electrical apparatus to which current is required to be supplied. The storage battery illustrated at 5 is an auxiliary source of current and supplies energy to the external circuit when the electromotive force of the storage battery is greater than the potential between the points on the line at which the terminals of said battery are connected. When the electromotive force of the storage battery is less than the potential between the points at which the terminals of the battery are connected, then said battery will receive the current and will be charged.

An auxiliary generator or booster 7 is located in series on the line, its brushes being connected, respectively, with bus-bars 2 and 2' by means of conductors 24 and 25, coil 17, and conductor 8. Preferably the field-windings of this generator or booster 7 are in shunt with the armature-windings of the same and are so shown in the drawings. A motor 13, which may be driven by any source of electric current, preferably by placing it in circuit across the line, as shown in the drawings, is adapted to drive the generator 7, the armature of the latter being belted or geared with the motor for this purpose. The magnetic field of this motor is energized by two distinct circuits, both of which are wound to assist each other and one of which comprises coil 17, which is in series on the line, while the other of which comprises a winding 14 in shunt with the armature-windings of said motor. In this circuit or winding 14 is placed a switch 26, by means of which the current through this circuit or winding may be cut in or out, as desired.

The operation of the system is as follows: As soon as motor 13 has been set in operation and has been running for a short time the current in the circuit or winding 14 of the motor is cut out by the proper actuation of the switch, the field of the motor being then energized by the single circuit through the coil 17, which, as before stated, is in series on the line. When now there is an increase of current in the line, the magnetic field of the motor will receive a corresponding increment of energy and the armature of the motor, and accordingly the armature of the auxiliary generator or booster, will thereby be driven with less speed. It will be obvious that the circuit through coil 17 is the line-circuit and that therefore the magnetization of the field due to coil 17 must be exactly proportional to the variation of current in the line-circuit. The current flowing through circuit 14 of the motor is usually and in some instances always a constant current. Thus the cutting out of circuit 14 in the field of the motor, which is only useful in energizing the field at the start, will render the variation of speed of the motor-armature more nearly in consonance with the variations of current in the line than would be the case if current were allowed to flow continuously through circuit 14.

As the resistance varies in the work-circuit the battery at 5 will be charged and discharged—that is, when the resistance increases in the work-circuit an extra voltage will be generated by the booster and the battery will be charged, and upon a decrease of resistance in the work-circuit the voltage from the booster will drop and the battery will discharge. In this way the fluctuations in the system caused by the variations in the resistance of the work-circuit will be taken up by the battery and the booster.

It will be readily understood that the booster or auxiliary generator, being actuated by the motor as above described, will supply electromotive force proportional to the speed of rotation of its armature, which proportion is not direct, but is some exponential function of the speed.

I claim as my invention—

1. In a system of electrical distribution, the combination with a main generator and consumption devices, of an auxiliary generator in series on the line, and a motor operatively connected with the armature of said auxiliary generator, said motor having two field-circuits one of which is in series on the line and the other of which is provided with a switch whereby the current through that circuit may be cut in or out as desired.

2. In a system of electrical distribution, the combination with a main generator and consumption devices, of an auxiliary generator and a motor operatively connected with the armature of said auxiliary generator, said motor having two field-circuits which are wound to assist each other and one of which is in series on the line while the other of which is provided with a switch, whereby the current through that circuit may be cut in or out as desired.

3. In a system of electrical distribution, the combination with a main generator and a storage battery, of an auxiliary generator in series on the line, and a motor operatively connected with the armature of said auxiliary generator, said motor having two field-circuits one of which is in series on the line and the other of which is provided with a switch whereby the current through that circuit may be cut in or out as desired.

4. In a system of electrical distribution, the combination with a main generator and consumption devices of an auxiliary generator in series on the line, a motor operatively connected with the armature of said auxiliary generator, said motor having two field-circuits, one of which circuits comprises an auxiliary coil in series on the line and the other of which circuits is in shunt with the circuit through the armature of said motor, and a switch in the second-named circuit whereby current through that circuit may be cut in or out as desired.

This specification signed and witnessed this 20th day of August, A. D. 1902.

LAMAR LYNDON.

In presence of—
PAUL MELTON,
F. G. COATES.